C. A. ANDERSON.
BEARING.
APPLICATION FILED NOV. 21, 1911.
1,119,056.
Patented Dec. 1, 1914.
2 SHEETS—SHEET 2.
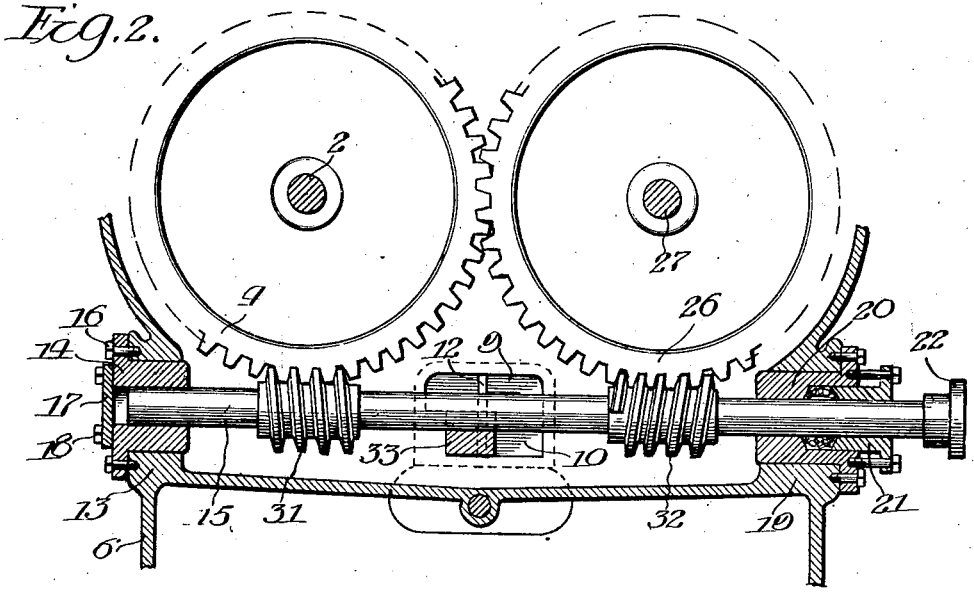
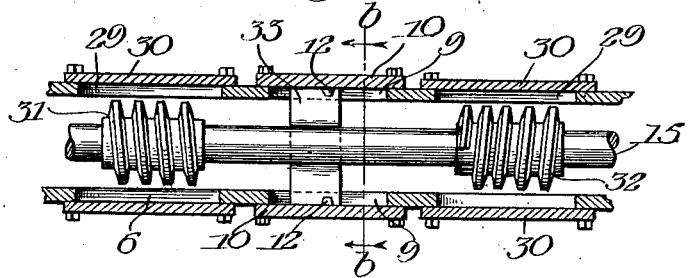
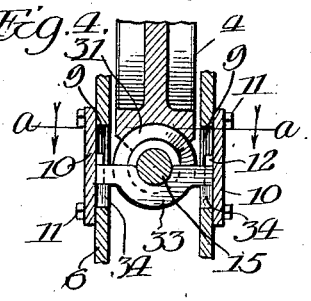
Witnesses
Inventor
Carl Antonius Anderson

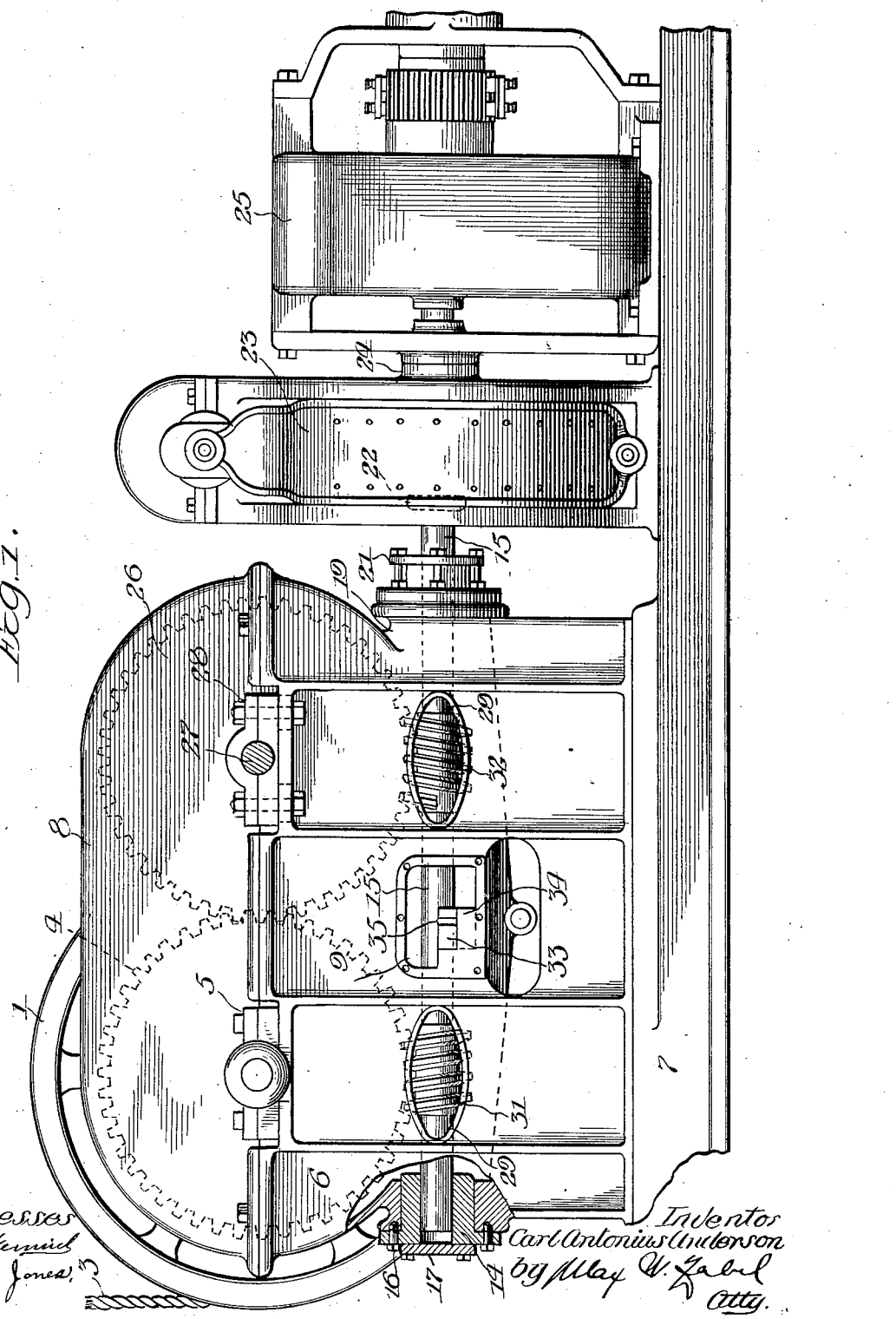

UNITED STATES PATENT OFFICE.

CARL ANTONIUS ANDERSON, OF CHICAGO, ILLINOIS.

BEARING.

1,119,056. Specification of Letters Patent. Patented Dec. 1, 1914.

Application filed November 21, 1911. Serial No. 661,533.

*To all whom it may concern:*

Be it known that I, CARL ANTONIUS ANDERSON, a citizen of the United States, residing at Chicago, in the county of Cook and State of Illinois, have invented a certain new and useful Improvement in Bearings, of which the following is a full, clear, concise, and exact description, reference being had to the accompanying drawings, forming a part of this specification.

My invention relates to power transmission mechanisms and is more particularly applicable for heavy duty bearings, such for instance as are used in connection with elevators of the freight or passenger type, and is designed to produce an improved mechanism of this kind.

While my invention is not limited to elevators, yet in the description herein I have set forth my invention as applied particularly to an elevator system for purposes of illustrating one form which my invention may take. The specific description following therefore is not intended to limit my invention to such use.

In the embodiment of the invention herein disclosed I utilize a drum for operating the elevator cable, which drum is suitably secured to a worm wheel, which worm wheel may be associated with an idler worm wheel. The two worm wheels are then driven by means of a shaft which is provided with two worms, one a right handed and the other a left handed worm. This shaft is preferably mounted at its extremities. In the novel arrangement of this power shaft as set forth herein, I provide a center bearing for this shaft between the worms, which center bearing is so associated with the framework of the mechanism that it is removable, whereby the worm shaft may be bodily removed preferably through one of the apertures provided for a bearing without having to displace any of the other apparatus connected with the said mechanism except the idler worm wheel. In this manner the shaft is properly supported and it is not necessary to entirely take apart the entire mechanism in order to replace or repair the shaft upon which the worms are mounted.

I will describe my invention more in detail by reference to the accompanying drawings illustrating the same as applied to an elevator system, in which:

Figure 1 is a side view partly in section of my improved mechanism; Fig. 2 is a sectional view of a portion of the apparatus to illustrate features of construction; Fig. 3 is a partial sectional view of a portion of the apparatus on lines *a—a* of Fig. 4; and Fig. 4 is a partial sectional view of a portion of the apparatus on lines *b—b* of Fig. 3.

Referring to the figures, I show a drum 1 secured to the shaft 2, which drum carries and operates the cable 3. The shaft also carries a worm wheel 4 and suitable bearings are provided, of which one is shown at 5 to support the shaft 2 with its associated apparatus. A housing 6 mounted on a suitable base 7 is provided within which the various mechanisms including the worm wheel 4 and worms associated therewith and to be described later are mounted. This housing has an inclosing hood 8 which is removable for purposes of inspection and repair. The two walls of the housing each have openings 9, 9 and cover plates 10, 10 held in place by suitable bolts 11 which close these openings 9 to entirely inclose the operating parts, as will be more clearly apparent later. The plates 10 have guides 12 whose purpose will be presently explained. The housing 6 has at one end an enlarged portion 13 which carries the bearing 14 for a shaft 15 and which bearing 14 is suitably held in place by means of the bolts 16. A cover plate 17 held in place by bolts 18 closes the aperture centrally of the bearing 14. The housing 6 at its opposite extremity has an enlarged portion 19 which carries a second bearing 20 for a shaft 15 and which is provided with a suitable packing box 21 as is well understood in the art. The end of the shaft 15 has a clutch member 22 which is suitably secured to the operating pulley of a brake mechanism 23. The shaft 15 through the interposition of the clutch member 22 is alined with and operated by a suitable motor 25. The worm wheel 4 is associated with a second worm wheel 26, which second worm wheel is mounted on the shaft 27 suitably supported in bearings provided in the housing 6 of which one is shown at 28. A bearing 28 and its corresponding bearing on the other side are made slidable as shown so that the worm wheel 26 may be moved away from engagement with the worm wheel 4. This is done so that the worm shaft may be removed as will presently appear. The second worm wheel 26 is preferably an idler worm wheel and coöperates with the worm wheel 4 in a manner well understood by those skilled in the art. Openings 29, 29 are likewise provided in the housing 6 which are suitably closed by means of plates 30.

As before stated the shaft 15 is mounted in bearings 14 and 20 and carries two worm wheels respectively 31 and 32, one of which is right handed and one of which is left handed so as to coöperate properly with the driving worm wheel 4 and the idler worm wheel 26. Hitherto it has been difficult in construction similar to this to remove the shaft with its worms from the housing without taking apart the entire apparatus, and the construction which I will now describe permits of this removal with a minimum effort. It is also of great advantage to have a bearing centrally of the worms and this central bearing has usually been in the way of the proper withdrawal of the shaft upon which the worms are mounted. The central portion of the shaft 15 between the two worms 31 and 32 rests upon and is carried by a bearing 33, which bearing is shown more in detail in Figs. 3 and 4, and which bearing rests upon the opposite walls of the housing 6 upon shelf-like portions 34 provided therein. This bearing 33 is likewise provided with grooves 35 which register with the extensions 12 of the cover plates 10, whereby the said bearing is held in place on the shelf 34.

Now, in order to remove the shaft 15 and the worms 31 and 32 the plates 10, 10 are removed and then the bearing 33 swung to the right until it is free of the shelf 34 so that it may be dropped downwardly out of engagement with the shaft 15. When thus removed, sufficient space is left so that the shaft 15 and the worms 31 and 32 may be moved toward the left over the said bearing to withdraw them from the housing, after the worms, of course, have been disengaged from the worm wheels 4 and 26. After the bearing 33 has been slid out of the way the bearing 14 may be removed and the coupling member 22 disengaged from the brake mechanism 23. The idler worm wheel 26 together with its bearings 28 is now moved to the right so that its teeth are disengaged from the teeth of the worm wheel 4, whereupon the shaft 15 can then be rotated until worms 31 and 32 are free from the worm wheels 4 and 26, at which time the worm 32 is between the worm wheels 4 and 26, after which the shaft 15 must be rotated in the opposite direction to permit the worm 32 to pass the worm wheel 4, whereafter the said shaft and worms may be entirely withdrawn.

It will thus be seen that a very simple device has been provided whereby the worm shaft may be readily withdrawn from its associated mechanism without in any way disturbing the heavy worm wheel and other associated parts.

My invention will thus be clear and it will also be clear that many modifications may be made from the structure set forth herein without departing from its scope.

Having thus described one form of carrying out my invention, what I claim as new and desire to secure by Letters Patent is:

A framework adapted to support a shaft having side walls parallel with said shaft and step-like projections in said side walls, a bearing adapted to rest upon said step-like projections to support a shaft and from which it may be slid sidewise along the projections to free the shaft, and cover plates for said side walls at said projections having means to hold the bearing in place.

In witness whereof, I hereunto subscribe my name this 18th day of November A. D., 1911.

CARL ANTONIUS ANDERSON.

Witnesses:
 JOHN C. A. ANDERSON,
 HAZEL JONES.

Copies of this patent may be obtained for five cents each, by addressing the "Commissioner of Patents, Washington, D. C."